US009000719B2

(12) United States Patent
Paetzold et al.

(10) Patent No.: US 9,000,719 B2
(45) Date of Patent: Apr. 7, 2015

(54) ELECTRIC MACHINE

(75) Inventors: Martin Paetzold, Tuebingen (DE); Julian Roesner, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 13/391,437

(22) PCT Filed: Jul. 16, 2010

(86) PCT No.: PCT/EP2010/060356
§ 371 (c)(1),
(2), (4) Date: May 7, 2012

(87) PCT Pub. No.: WO2011/020665
PCT Pub. Date: Feb. 24, 2011

(65) Prior Publication Data
US 2012/0206094 A1   Aug. 16, 2012

(30) Foreign Application Priority Data
Aug. 18, 2009 (DE) .......................... 10 2009 028 605

(51) Int. Cl.
*H02J 7/00* (2006.01)
*H02K 11/04* (2006.01)
*H02P 9/48* (2006.01)
*F02N 11/04* (2006.01)
*F28D 21/00* (2006.01)

(52) U.S. Cl.
CPC ............ *H02K 11/048* (2013.01); *H02P 9/48* (2013.01); *F02N 11/04* (2013.01); *F28D 2021/0029* (2013.01)

(58) Field of Classification Search
CPC ............................. Y02E 60/12; H02J 7/0016
USPC ................................................ 320/107, 119
See application file for complete search history.

(56) References Cited

U.S. PATENT DOCUMENTS

| 5,727,622 A * | 3/1998 | Gurevich et al. ............ 165/80.3 |
| 6,184,600 B1 | 2/2001 | Asao et al. |
| 2009/0243407 A1 | 10/2009 | Kato et al. |
| 2014/0292238 A1 * | 10/2014 | Furukawa et al. ....... 318/400.02 |

FOREIGN PATENT DOCUMENTS

| CN | 200947585 | 9/2007 |
| DE | 29714730 | 10/1997 |
| DE | 29814078 | 11/1998 |
| EP | 1466779 | 10/2004 |
| WO | 9909594 | 2/1999 |

OTHER PUBLICATIONS

PCT/EP2010/060356 International Search Report dated Jan. 25, 2012 (Translation and Original, 7 pages).

* cited by examiner

*Primary Examiner* — Suresh Memula
(74) *Attorney, Agent, or Firm* — Michael Best & Friedrich LLP

(57) ABSTRACT

The invention relates to an electric machine (10), particularly a generator or a starter generator for a motor vehicle, comprising a converter (64) which is arranged on a cooling element (53) and composed of semiconductor switching elements (58, 59) actuated synchronously with the phase frequency for rectifying a generator alternating voltage or supplying a motor from a DC voltage source (61). According to the invention, the cooling element (53) has a base plate (55) and cooling fins (54), wherein the ratio of the surface wetted by coolant to the volume of the cooling element (53) ranges from 0.5 to 1.5 [l/mm], preferably from 0.8 to 1.0 [l/mm].

23 Claims, 5 Drawing Sheets

ELECTRIC MACHINE

BACKGROUND OF THE INVENTION

The invention proceeds from an electrical machine having a control apparatus as described, for example, in EP 1 466 779 A2. The converter disclosed in said document is designed to reduce the electrical losses with semiconductor switching elements which, in generator mode, rectify the AC voltage which is delivered by the generator, and, in the motor mode, invert the voltage which is delivered by a DC voltage source. Semiconductor switching elements of this kind have a high degree of efficiency on account of low voltage drops during operation, but, on the other hand, there is an increased risk of damage to the switching elements under a high loading, in particular when used in a motor vehicle where severe fluctuations in temperature and loading often occur.

SUMMARY OF THE INVENTION

The electrical machine according to the invention has the advantage that the desired high degree of efficiency of the circuit arrangement is achieved both in the motor mode and in the generator mode but, on the other hand, impermissible heating of the circuit breakers is ensured both under brief, very high loading and in the event of long-term loading under unfavorable operating conditions, in particular at high ambient temperatures. This guarantee is achieved to a particularly high level when the ratio of the surface to the volume of the cooling body is in the range of from 0.8 to 1.0 [l/mm], in particular in the range of from 0.87 [l/mm] to 0.96 [l/mm]. This ensures sufficient heat dissipation from the components both in the case of long switch-on periods and at load peaks. It is also ensured that the voltage peak, which occurs when MOSFETs are switched off and which is produced by the current being switched off, and the heating peak caused by said voltage peak are controlled, it being possible for the level of said heating peak to lead to overloading of the semiconductor switching elements, in particular when high currents and high inductances in the feed lines to the switches are switched off. On account of the reliable control of the heat dissipation from the switching elements together with the improved degree of the efficiency, the production costs for the machine can also be reduced as a result of a relatively small installation space and the emission of noise can also be reduced as a result of the reduced fan size.

It has proven advantageous when the actuation circuit for the semiconductor switching elements and the switching elements themselves are arranged on a common cooling body because the production costs for the arrangement are reduced as a result. This common arrangement is made possible, in particular, on account of the base plate of the cooling body being in the form of a heat storage means which can dissipate a relatively large quantity of heat from the components very quickly, the said quantity of heat being produced, in particular, by voltage peaks resulting from feed line inductances when the current is switched off. The cooling effect of the cooling body is particularly efficient when said cooling body is mounted on the outside on an end plate of the machine and the cooling air reaches the cooling body with a low level of flow losses. In order to further reduce the flow resistance of the cooling air, in this case the large surfaces of the cooling ribs run substantially in the direction of flow of the cooling air and form radial flow channels to create a central inlet for the cooling air into the interior of the machine.

The semiconductor switching elements of the converter are expediently arranged on that surface of the cooling body base plate which is averted from the cooling ribs, while the cooling ribs, for their part, directly face the coolant striking them. The switching elements and their actuation circuit are therefore arranged axially on the inside on the base plate of the cooling body and the cooling rubs are arranged axially on the outside on that side of the cooling body which faces a protective cap.

The switching elements and/or their actuation circuit are fastened in an advantageous, highly thermally conductive and at the same time electrically insulating manner when said switching elements and/or actuation circuit are held on the cooling body via DBC (Direct Bonded Copper) substrates. In addition, the switching elements and/or their actuation circuit can be enclosed, preferably encapsulated, in plastic in order to further improve mechanical protection of said switching elements and/or actuation circuit and protection against moisture and soiling.

In respect of the further design of the cooling body, it is expedient when, in order to achieve the greatest possible cooling effect, the base plate of the cooling body is substantially in the form of a circular disk with a diameter which corresponds to the size of the machine, with the switching elements expediently being arranged on a relatively large segment and the actuation circuit being arranged on a relatively small segment of the base plate. This results in a compact design with short feed lines from the actuation circuit to the individual switching elements. In this case, the switching elements are expediently uniformly distributed over that segment of the cooling body which is occupied by them and advantageously arranged such that in each case one so-called high-side switching element and one low-side switching element of a phase are radially adjacent and preferably in each case associated with a separate group of cooling ribs.

BRIEF DESCRIPTION OF THE DRAWINGS

An exemplary embodiment of the invention is illustrated in the drawings and explained in greater detail in the following description.

In the drawings.

DETAILED DESCRIPTION

Figure 1:
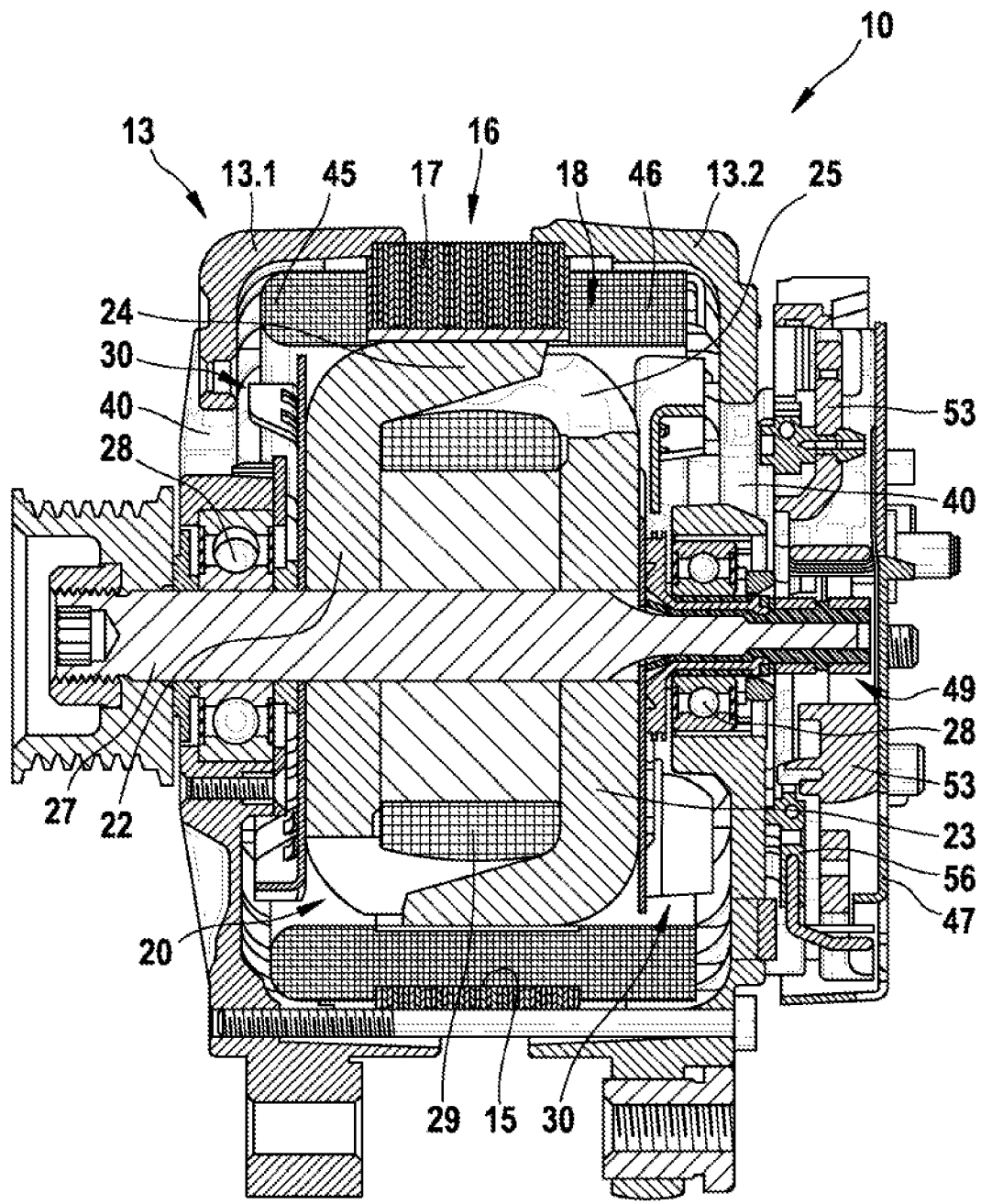
FIG. 1 shows a longitudinal section through an electrical machine which is designed as an AC generator for motor vehicles.

FIG. 1 shows a section through an AC generator 10 for motor vehicles. Said AC generator has, amongst other things, a two-part housing 13 which comprise a first end plate 13.1 and a second end plate 13.2. The end plate 13.1 and the end plate 13.2 accommodate a stator 16 having a laminated core 17 which is in the form of a ring, a stator winding 18 being inserted into the slots 15 in said laminated core, said slots being open toward the inside and extending in the axial direction. The annular stator 16, by way of its radially inwardly directed surface, surrounds an electromagnetically excited rotor 20 which is in the form of a sixteen-pole claw pole rotor.

The rotor 20 comprises, amongst other things, two claw pole boards 22 and 23, in each case eight claw pole fingers 24 and 25 which extend in the axial direction being arranged on the outer circumference of said claw pole boards. The two claw pole boards 22 and 23 are arranged in the rotor 20 such that their claw pole fingers 24, 25, which extend in the axial direction, alternate with one another as north and south poles on the circumference of the rotor 20. This therefore results in magnetically required claw pole intermediate spaces between the claw pole fingers 24 and 25, which are magnetized in opposite senses, which run with a slight incline relative to the machine axis on account of the claw pole fingers which taper toward their free ends. This profile is simply referred to as axial for the following description of the invention.

The rotor 20 is rotatably mounted in the respective end plates 13.1 and 13.2 by means of a shaft 27 and in each case one rolling bearing 28 which is located on in each case one side. Said rotor has two axial end faces, a fan 30 being fastened to each of said end faces. These fans 30 essentially comprise a section which is in the form of a plate or disk and from which fan blades originate, in a known manner. The fans 30 firstly generate a cooling air stream over the cooling body 53 and secondly are used to allow air to be exchanged via openings 40 in the end plates 13.1 and 13.2 between the outside and the interior of the electrical machine 10. For this purpose, the openings 40 are provided at the axial ends of the end plates 13.1 and 13.2 and are used to draw cooling air into the interior of the electrical machine 10 by means of the fans 30. The cooling air is accelerated radially outward by the rotation of the fans 30 such that it can also pass through the winding overhang 45, through which cooling air can pass, on the drive side and the winding overhang 46, through which cooling air can pass, on the electronics side. This action cools the winding overhangs. After passing through the winding overhangs and after flowing around these winding overhangs, the cooling air adopts a radially outward path, through openings (not illustrated).

In FIG. 1, there is a protective cap 47 on the right-hand side, which protects various components against environmental influences. By way of example, this protective cap 47 covers a slipring assembly 49, which is used to supply a field current to a field winding 29. A cooling body 53 is arranged around this slipring assembly 49. A connection plate 56 for the semiconductor switching elements 58, 59 (shown in FIG. 2) and their actuation circuit 60 is situated between the end plate 13.2 and the cooling body 53.

Figure 2:
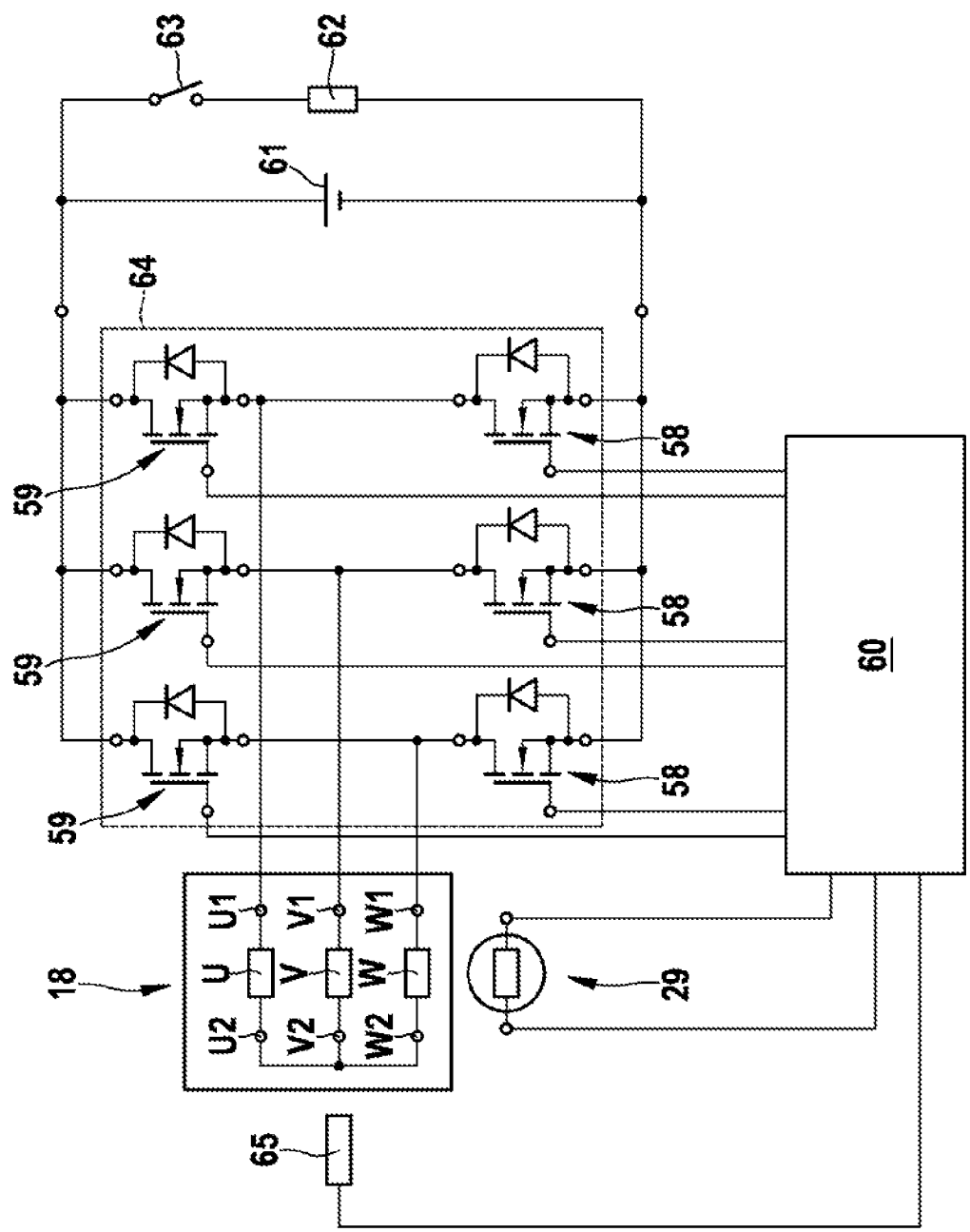
FIG. 2 shows a circuit diagram of a three-phase AC machine.

FIG. 2 shows a circuit diagram of a three-phase AC machine, for example designed as an AC generator having a converter 64 in the form of a synchronous rectifier or as a starter generator, in which the switching elements 58 and 59 are connected to a DC voltage source 61 by means of the actuation circuit 60. A load 62 can be connected to the DC voltage source 61 by means of a switching device 63. The three sections of the stator winding 18, which sections are connected to the switching elements 58, 59 by means of busbars, are designated U, V, W, the respective connections to the switching elements 58 and 59 are designated U1, V1, W1, and the section connections which are interconnected to form a star are designated U2, V2, W2. The phase position in the stator winding 18 is monitored by a sensor 65 which delivers corresponding signals to the actuation circuit 60 for synchronous actuation of the switching elements 58 and 59 and for feeding the field winding 29. In this case, with the electrical machine according to the invention designed as a generator of a motor vehicle, the switching elements 58 and 59 which are preferably in the form of MOSFETs replace the diodes which are used in conventional generators, and in the process form a rectifier which is actuated synchronously to the phase position and exhibits considerably fewer losses during operation than a rectifier based on semiconductor diodes. The advantage of the reduced losses when using semiconductor switching elements for rectification clearly outweighs the additional expenditure for their actuation circuit 60. In addition, the design of the converter 64 with controllable semiconductor switching elements creates the possibility of forming the electrical machine as a starter generator for the internal combustion engine, with the result that a separate starter is dispensed with.

Figure 3A:
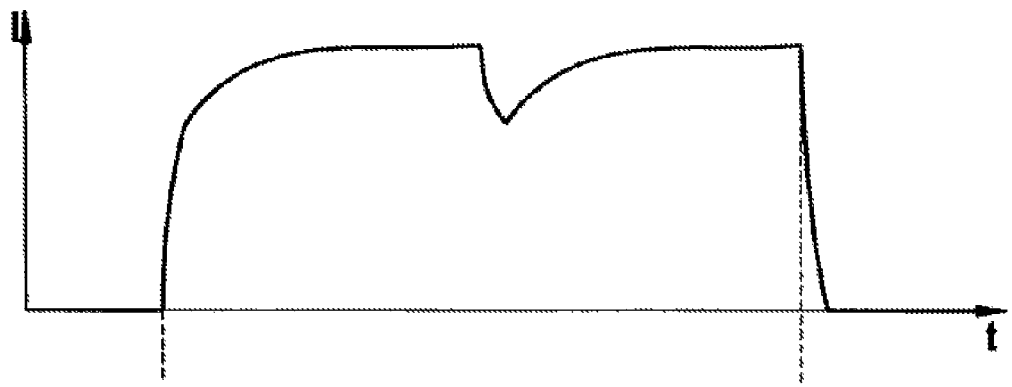
FIG. 3 shows, in illustration a), the current profile and, in illustration b), the associated temperature profile on a MOSFET switching element during a half-wave of the phase current of the machine.
Figure 3B:
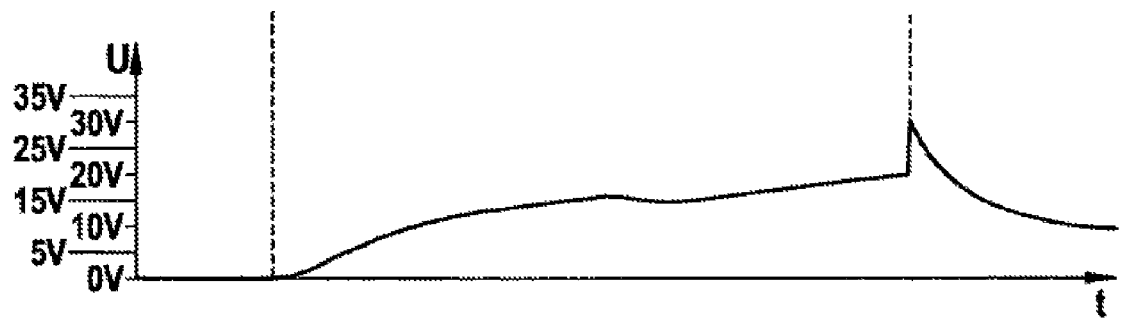

FIG. 3 shows the problem with using MOSFETs as switching elements for the converter 64. In the figure, FIG. 3a shows the typical current profile in the switching element during a switch-on period and FIG. 3b shows the associated voltage profile across the switching element. The short interruption in current is caused by the commutation of the current within a second group of switching elements, that is to say, for example, during commutation of the current of the phase U which changes from phase V to phase W on the low side. When the current is interrupted, a voltage peak occurs, this voltage peak greatly increasing the power loss of the switching element and therefore the heating of said switching element for a brief period, in addition to the rising power loss during the switch-on period. In this case, the $I^2R$ losses during the switch-on period of the MOSFET are dependent on the level of the connected current and on its contact resistance. Heating as a result of the voltage peak when the MOSFET is switched off depends on the level of the current and on the inductance of the feed line between the voltage source 61 and the switching element, for which purpose the converter was generally arranged in the vicinity of the voltage source in conventional applications, in particular for operation of the machine as a motor. However, on account of the measures according to the invention for improving the cooling effect on the converter, it is possible to also arrange a converter which is designed with semiconductor switching elements directly on the electrical machine.

FIG. 4 shows, once again in a schematic illustration, the mechanical design of the converter-side end of a machine according to the invention. In this case, the cooling body 53 is mounted on the machine outside the end plate 13.2 and is covered by a protective cap 47. The protective cap has axial inlet openings 67 and radial inlet openings 69 for the cooling air, said inlet openings both preferably being arranged close to the outer end of cooling ribs 54 of the cooling body 53. The cooling ribs 54 themselves run substantially radially on a base plate 55, which is in the form of a circular disk, of the cooling body 53 and thus conduct the cooling air stream with a low flow resistance to a central opening 71 in the base plate of the cooling body and, from there, axially into the interior of the machine via openings 73 in the end plate 13.2, with the openings 71 in the base plate and the openings 73 in the end plate being substantially aligned with one another in order to keep the flow resistance low in this region too. The cooling air stream is indicated by lines 75, 76 and 77. Said cooling air stream is discharged from the machine once again in the radial direction in a conventional manner.

The semiconductor switching elements 58 and 59 are arranged on the axially inner side, which is opposite the cooling ribs 54, of the base plate 55 of the cooling body 53 in such a way that the switching elements of a phase are each radially aligned. In this case, in the exemplary embodiment, the (high-side) switching elements 59 which are connected to the positive pole of the voltage source 61 are situated on an inner radius, and the (low-side) switching elements which are connected to the negative pole of the voltage source are situated radially outside. The actuation circuit 60 for the switching elements is not shown in this illustration but, in the same way as the switching elements 58, 59, it is arranged so as to be situated radially inside on the base plate 55, as is shown by dashed lines in FIG. 5.

Both the base plate 55 and the cooling ribs 54 of the cooling body 53 are composed of aluminum or an aluminum alloy of good thermal conductivity. In this case, the entire cooling body 53 is designed in such a way that firstly, in particular on account of the cooling ribs 54, a sufficiently large surface and secondly an adequate storage volume of the base plate 55 which is in direct thermal contact with the semiconductor switching elements and the actuation circuit are produced for rapid dissipation of heat, which is generated during switching, from the components. To this end, the ratio of the total surface to the total volume of the cooling body 53 should be in the range of from 0.5 to 1.5 [1/mm]. An optimum ratio of the surface to the volume of the cooling body in respect of heat dissipation on the one hand and heat absorption on the other hand is in the range of from 0.8 to 1.0 [1/mm], in particular in the range of from 0.87 to 0.98 [1/mm], in this case. In this embodiment, the cooling action of the cooling body 53 is so effective that it can be integrated into the machine without difficulties, this resulting in considerable structural and cost-related advantages over a separate component which is arranged at this point. Both sufficient heat discharge to the surrounding area during stationary operation and rapid heat dissipation of temperature peaks which occur are ensured in this case. In particular, the relatively high degree of efficiency of a synchronous rectifier which is designed with semiconductor switching elements compared with a diode rectifier can therefore be used without the risk of damage to the switching elements.

Figure 4:
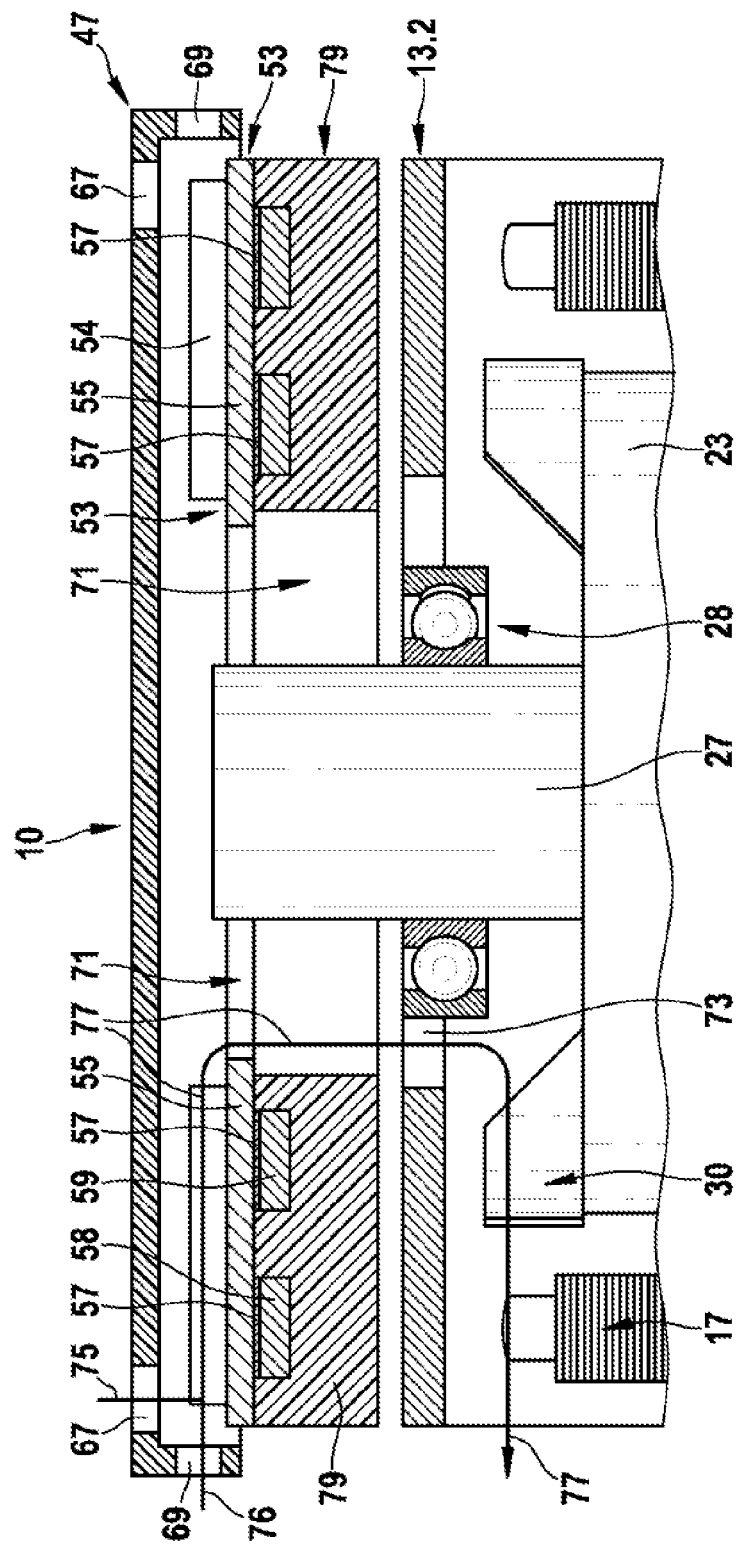
FIG. 4 shows a basic illustration of the converter-side end of an electrical machine according to the invention.

Good thermal coupling between the switching elements 58 and 59, which are in the form of MOSFETs, and the base plate 55 of the cooling body 53 is achieved in this case by the use of DBC (Direct Bonded Copper) substrates which are indicated by reference symbol 57 in FIG. 4 and which electrically insulate the switching elements in a manner known in principle but connect said switching elements to the base plate 55 of the cooling body with very good thermal coupling.

Additional permanent protection of the switching elements 58, 59 and of the actuation circuit 60 against corrosion and against mechanical effects is provided by the electronic components being enclosed, preferably encapsulated, in plastic on the axially inner surface of the base plate 55.

Figure 5:
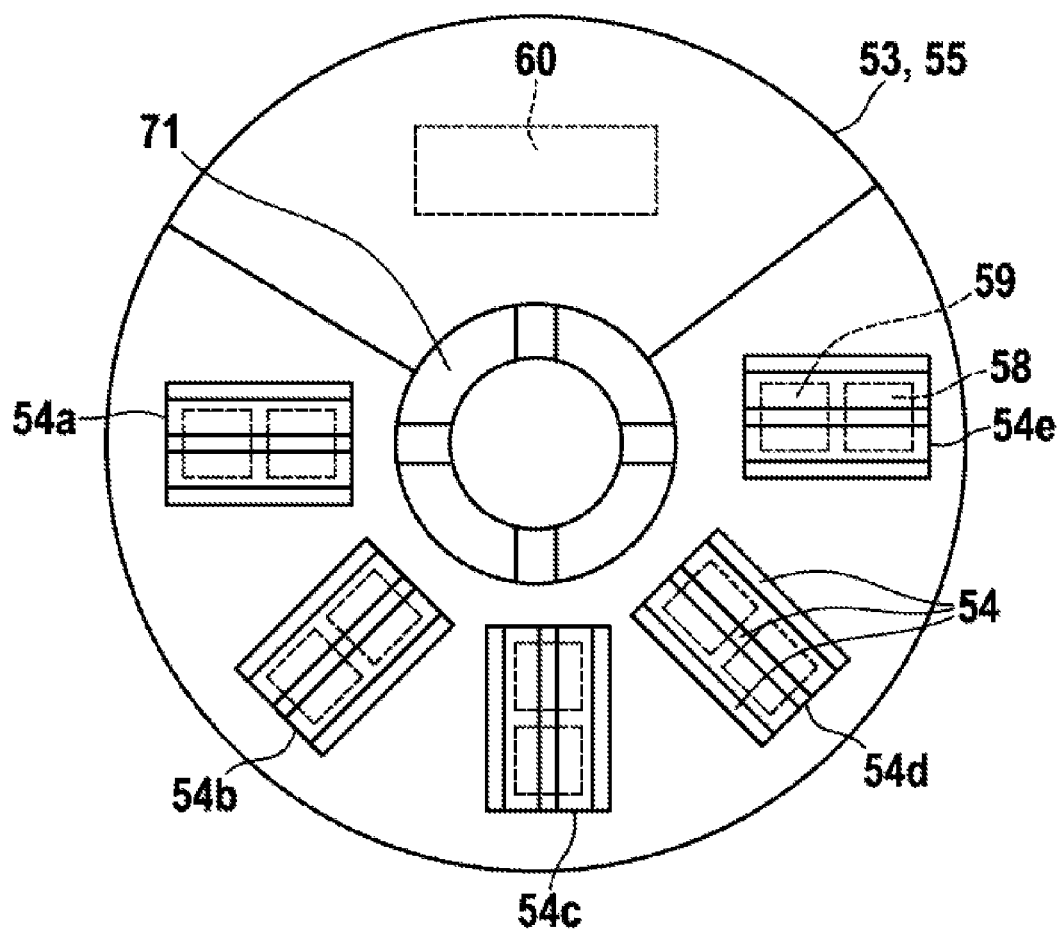
FIG. 5 shows a schematic plan view of that surface of the cooling body of the machine which is fitted with the cooling ribs.

FIG. 5 shows a plan view of the surface of the cooling body 53, said surface being provided with cooling ribs 54. This illustration shows that the base plate 55 is substantially in the form of a circular disk, with the switching elements 58, 59 which are arranged on the rear face (not shown) of the base plate being arranged on a relatively large segment of more than 200° and the actuation circuit 60 being arranged on the remaining relatively small segment. In this case, the switching elements 58, 59 are uniformly distributed over the relatively large segment of the base plate and in this case preferably assigned to a separate group 54a-54e of cooling ribs in pairs with a radial orientation. The individual cooling ribs 54 are preferably integrally produced with the base plate 55 as a cast part. However, as an alternative, it is also possible to produce the base plate and the cooling ribs or groups of cooling ribs separately and to subsequently connect them to one another.

The advantageous dimensioning and design of the cooling body 53 ultimately result from a large number of boundary conditions: firstly, the length of the machine in the axial direction and its weight are fundamentally limited taking into account the respectively required power. This results, firstly, in limiting of the height of the cooling ribs 54 and, secondly, limiting of the thickness of the base plate. In addition, it should be possible to manufacture the cooling body as a cast part where possible, and for this reason the cooling ribs have to have a certain minimum thickness. In addition, the shape and the size of the cooling ribs are limited by a maximum permissible flow resistance of the cooling air since, otherwise, the fan power has to be increased, as a result of which the efficiency of the generator falls overall. These boundary conditions result in the claimed ratio between the surface which is wetted by the coolant and the volume of the cooling body 53, said volume being responsible for the direct heat dissipation from the semiconductor switching elements. In this case, the wetted surface is that face which is in direct contact with the coolant (here: the cooling air) and is not covered by other components, for example by fastening means.

One exemplary embodiment of the cooling body according to the invention was designed as follows:
thickness of the base plate 55: 3 mm
height of the cooling ribs 54: 15 mm
inside radius of the base plate 55 in the region of the central opening 71: 28 mm
outside radius of the base plate 55: 60 mm
volume of the entire cooling body 53: 48,241 mm$^3$
wetted surface of the cooling body 53: 46,100 mm$^2$
ratio of the surface of the cooling body to the volume of said cooling body: 0.96 l/mm

The invention claimed is:

1. An electrical machine, having a converter (64), which is arranged on a cooling body (53) and includes semiconductor switching elements (58, 59) which are actuated synchronously with a phase frequency, for rectifying a generator alternating voltage or for feeding a motor from a DC voltage source (61), with the cooling body (53) having a base plate (55) and cooling ribs (54) and the ratio of a surface which is wetted by coolant to the volume of the cooling body (53) being in the range of from 0.5 [l/mm] to 1.5 [l/mm].

2. The electrical machine as claimed in claim 1, characterized in that the ratio of the surface which is wetted by the coolant to the volume of the cooling body (53) is in the range of from 0.8 [l/mm] to 1.0 [l/mm].

3. The electrical machine as claimed in claim 1, characterized in that the cooling body (53) is composed of aluminum or an aluminum alloy with a thermal conductivity of over 200 W/m·K.

4. The electrical machine as claimed in claim 1, characterized in that it is in the form of a three-phase, electrically excited generator having a synchronous rectifier, for charging a battery (61).

5. The electrical machine as claimed in claim 1, characterized in that MOSFETs serve as semiconductor switching elements (58, 59).

6. The electrical machine as claimed in claim 1, characterized in that an actuation circuit (60) and the semiconductor switching elements (58, 59) which are controlled by the circuit are arranged on a common cooling body (53).

7. The electrical machine as claimed in claim 1, characterized in that at least one of the cooling body (53) having the converter (64) and the actuation circuit (60) is mounted on the outside of an end plate (13.2) of the machine (10) and is covered by a protective cap (47).

8. The electrical machine as claimed in claim 7, characterized in that the protective cap (47) has at least one of axial and radial openings (67, 69) for the targeted admittance of cooling air (67, 69) to the cooling body (53).

9. The electrical machine as claimed in claim 1, characterized in that the cooling body (53) has at least one central opening (71) for the passage of cooling air.

10. The electrical machine as claimed in claim 1, characterized in that the base plate (55) of the cooling body (53) is a heat sink.

11. The electrical machine as claimed in claim 1, characterized in that the base plate (55) of the cooling body (53) is fitted with the switching elements (58, 59) on a surface which is averted from the cooling ribs (54).

12. The electrical machine as claimed in claim 1, characterized in that the cooling ribs (54) of the cooling body (53), by way of large surfaces, run substantially in the direction (77) of flow of the coolant.

13. The electrical machine as claimed in claim 1, characterized in that the cooling ribs (54) form radial flow channels.

14. The electrical machine as claimed in claim 7, characterized in that the switching elements (58, 59) and an actuation circuit (60) are arranged axially on an inside on the base plate (55) of the cooling body (53) and the cooling ribs (54) are arranged axially on an outside of the base plate on a side of the cooling body (53) which faces the protective cap (47).

15. The electrical machine as claimed in claim 1, characterized in that at least one of the switching elements (58, 59) and an actuation circuit (60) are connected in a thermally coupled and electrically insulated manner to the cooling body (53) via DBC (Direct Bonded Copper) substrates (57).

16. The electrical machine as claimed in claim 1, characterized in that at least one of the switching elements (58, 59) and an actuation circuit (60) are enclosed in plastic (79).

17. The electrical machine as claimed in claim 1, characterized in that the base plate (55) of the cooling body (53) is substantially in the form of a circular disk, with the switching elements (58, 59) being arranged on a relatively large segment and an actuation circuit (60) being arranged on a relatively small segment.

18. The electrical machine as claimed in claim 1, characterized in that the switching elements (58, 59) are uniformly distributed over a segment of the cooling body (53).

19. The electrical machine as claimed in one claim 1, characterized in that in each case one high-side switching element (59) and one low-side switching element (58) of a phase are arranged on the cooling body (53) in a radially adjacent manner and are jointly associated with a group (54a-54e) of cooling ribs.

20. The electrical machine as claimed in claim 1, characterized in that the cooling body (53) is integrally produced as a cast part.

21. The electrical machine as claimed in claim 1, characterized in that the ratio of the surface which is wetted by the coolant to the volume of the cooling body (53) is in the range of from 0.87 [1/mm] to 0.96 [1/mm].

22. The electrical machine as claimed in claim 1, characterized in that it is in the form of a three-phase, electrically excited generator having a full-bridge rectifier arrangement for charging a battery (61).

23. The electrical machine as claimed in claim 1, characterized in that at least one of the switching elements (58, 59) and an actuation circuit (60) are encapsulated in plastic (79).

\* \* \* \* \*